UNITED STATES PATENT OFFICE.

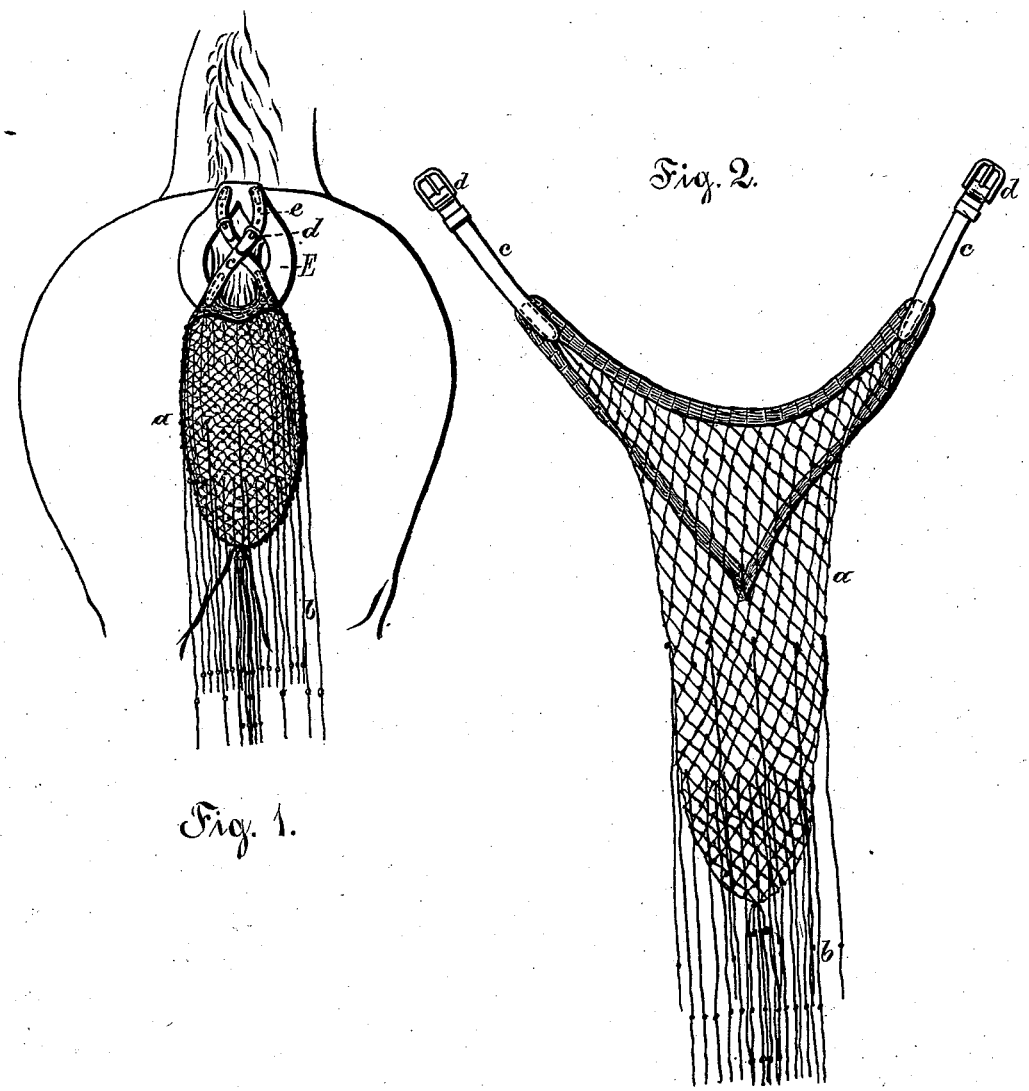

ALEXANDER WEIDE, OF CHICAGO, ILLINOIS.

IMPROVEMENT IN HORSE-TAIL PROTECTORS.

Specification forming part of Letters Patent No. 209,737, dated November 5, 1878; application filed May 7, 1878.

*To all whom it may concern:*

Be it known that I, ALEXANDER WEIDE, of Chicago, in the county of Cook and State of Illinois, have invented a new and Improved Horse-Tail Protector, of which the following is a full and exact description, reference being had to the accompanying drawing, forming part of this specification, in which—

Figure 1 represents the protector placed over the horse's tail and attached to the harness, and Fig. 2 an elevation of the protector while spread out.

The nature of my invention relates to an attachment to a harness for the purpose of protecting the horse's tail against coming into contact with the mud and manure and for preventing the hair of the tail from becoming entangled; and it consists of a bag made of netting provided with a long fringe, which is put over the tail of the horse and is buckled to the harness crupper-loop.

In the drawing, $a$ is a bag made of netting, one side of which is partly split open, so as to enable an easy attachment over the horse's tail, and the edges of which have a ribbon binding, by which it is suspended. $b$ are fringes pendent from the sides and bottom of said bag for better appearance and for holding away the flies by the horse's motions. $c$ are short straps attached to the upper binding, each provided with a buckle, $d$, for coupling with small billets $e$ attached to the crupper-loop E of the harness. This bag is put over the horse's tail, with the split-open side forward, and is suspended to the crupper E of the harness by the straps $c$, being crosswise buckled with the billets $e$.

By this attachment the tail is kept clear of the mud and manure without affecting the horse's motions; and, as a well-grown tail is one of the beauties of a horse, this protector will assist in fostering the same.

What I claim as my invention is—

The herein-described horse-tail protector, consisting of bag $a$, fringes $b$, straps $c$, and buckles $d$, all constructed and arranged to be attached to the harness substantially as and in the manner set forth.

ALEXANDER WEIDE.

Witnesses:
EMIL H. FROMMANN,
LOUIS KLINOKERFUER.